(12) United States Patent
Caccavale et al.

(10) Patent No.: US 8,763,015 B1
(45) Date of Patent: Jun. 24, 2014

(54) EFFICIENT MULTI-NODE SYSTEM FOR PROVIDING EVENT INFORMATION TO EVENT HANDLING COMPONENTS

(75) Inventors: Frank S. Caccavale, Hopedale, MA (US); Sridhar Villapakkam, Grafton, MA (US); Ajit Bhagwat, Franklin, MA (US); Luc Van Brabant, Plaisir (FR); Frederic Corniquet, Le Pecq (FR)

(73) Assignee: EMC Corporation, Hopkinton, MA (US)

( * ) Notice: Subject to any disclaimer, the term of this patent is extended or adjusted under 35 U.S.C. 154(b) by 1423 days.

(21) Appl. No.: 12/241,939

(22) Filed: Sep. 30, 2008

(51) Int. Cl.
*G06F 9/46* (2006.01)
(52) U.S. Cl.
USPC ............... 719/318; 718/105; 714/100; 714/1
(58) Field of Classification Search
None
See application file for complete search history.

(56) References Cited

U.S. PATENT DOCUMENTS

| | | | | |
|---|---|---|---|---|
| 5,805,785 | A * | 9/1998 | Dias et al. | 714/4.4 |
| 7,145,898 | B1 * | 12/2006 | Elliott | 370/352 |
| 2005/0216498 | A1 * | 9/2005 | Georgalas et al. | 707/102 |
| 2006/0248539 | A1 * | 11/2006 | Sanghvi et al. | 719/318 |
| 2007/0168756 | A1 * | 7/2007 | Aiello | 714/44 |
| 2007/0283364 | A1 * | 12/2007 | Deininger et al. | 719/318 |
| 2008/0134178 | A1 * | 6/2008 | Fitzgerald et al. | 718/1 |
| 2008/0307180 | A1 * | 12/2008 | Hattori et al. | 711/163 |
| 2009/0034537 | A1 * | 2/2009 | Colrain et al. | 370/400 |
| 2009/0070784 | A1 * | 3/2009 | Schmidt et al. | 719/318 |
| 2009/0150907 | A1 * | 6/2009 | Aharoni et al. | 719/318 |

OTHER PUBLICATIONS

Caccavale, et al., U.S. Appl. No. 12/241,855, filed Sep. 30, 2008 "Providing Context Information for Events to an Event Handling Component".
Caccavale, et al., U.S. Appl. No. 12/241,893, filed Sep. 30, 2008 "Orchestrating Flow of Event Information to Several Event Handling Components".

* cited by examiner

*Primary Examiner* — Tuan Dao
*Assistant Examiner* — Shih-Wei Kraft
(74) *Attorney, Agent, or Firm* — Muirhead and Saturnelli, LLC

(57) ABSTRACT

Event management techniques for use in a computer system comprising an event generating component generating at least one event and an event handling component to apply one or more business process rules in response to the event. In one embodiment of the invention, an event generation component provides to an event handling component not only notification of an event but also context information about the event, in the same communication. The context information may provide all the information necessary for the event handling component to apply one or more business policy rules to determine how to handle the event. In some implementations having multiple event handling components of different types, the event generating component may be configured to provide notification of events to the event handling components in a specified order. In some implementations, multiple event handling components may be joined in a logical pool, sharing responsibility for handling events.

17 Claims, 12 Drawing Sheets

EFFICIENT MULTI-NODE SYSTEM FOR PROVIDING EVENT INFORMATION TO EVENT HANDLING COMPONENTS

BACKGROUND OF INVENTION

1. Field of Invention

Embodiments of the present invention relate to techniques for providing context information about an event to an event handling component so that the event handling component is not required to seek out the context information to determine how to handle the event.

2. Discussion of Related Art

Computer systems, such as those including a client and server in communication with one another, may perform a number of operations that may be managed by a component of the computer system. For example, in a computer system where the client is accessing a data store via the server, the server—or another component of the computer system—may determine whether the operation is permitted according to rules set up for performing access operations.

In many cases, the component making the decision regarding whether the operation is permitted may require multiple types of information on the operation to determine whether the operation is permitted. For example, in some cases the rules for performing access operations may dictate that only certain users of the computer system are permitted to perform access operations, and the component may need to be aware of which user is performing the operation to determine whether the operation is permitted.

The information used to make the decision on whether to permit the operation may not be immediately available to the component upon receiving notification of the operation. The component making the decision therefore may be required to retrieve from other sources the additional information to be capable of making the decision.

FIG. 1 shows one example of a computer system that retrieves additional information to enable it to make a decision regarding whether to permit an operation. In the computer system of FIG. 1, a client 100 is attempting to access a data store 104 via a file system server 102 by transmitting an operation request in communication 1 to the file system server 102. In communication 2, the file system server 102 passes information regarding the operation to another component 106 that complements a content management system for the data on the store 104. The component 106 is adapted to determine whether the operation is permitted, based on comparing information about the operation to content management rules regarding operations of the type requested by client 100. As described above, however, the information regarding the operation exchanged in communication 2 is not sufficient for the component 106 to determine whether to permit the operation. In many cases, the information transmitted in communication 2 by the server 102 may be nothing more than what was transmitted in communication 1 by the client 100. For example, the content management system of component 106 may need to determine whether the data in the data store 104 to which the client 100 wants access is protected, so that it is accessible to only certain users of the computer system. Additional information than that provided in the communication 2, such as context information describing an environment in which the operation is to be performed (e.g., an identity of a user issues the request), is therefore required and must be retrieved. The component 106 may then send out communications 3 and 5 to other components of the computer system, including client 100 and server 108, to gather this additional information, and may receive the responses 4 and 6 with this additional information. The component 106 can then determine, using both the original information from the server 102 and the additional information, whether the operation is permitted by applying rules maintained by the component 106, and inform the server 102 in communication 102 to permit the operation. In communication 8, the server 102 requests the data from the data store 104, receives the data in communication 9, and provides it to the client 100 in communication 10.

In the process illustrated in FIG. 1 only one component 106 evaluates an operation. In some systems, multiple different components may analyze the same operation for different reasons. Typically, each component that makes an evaluation does so in response to an event notifying the component of the occurrence of the relevant operation. A filter driver for each component typically is placed in the input/output (I/O) stack of the computer's operating system to analyze incoming communications and determine whether the communication relates to an operation to be analyzed by the component. Each component may then handle the operation as it receives the event through the I/O stack.

SUMMARY OF INVENTION

In one embodiment, there is provided a method for use in a computer system. The computer system comprises an event generating component that monitors activity in the computer system and generates one or more events in response to activity in the computer system and a plurality of event handling components that each applies at least one business process rule to determine at least one aspect of how the computer system should respond to an event. The method comprises an act of for at least one first event, creating a first logical pool of event handling components from among the plurality of event handling components. The first logical pool of event handling components comprises at least two event handling components capable of handling the at least one first event by applying at least one business process rule to determine at least one aspect of how the computer system should respond to the at least one first event.

In another embodiment, there is provided at least one computer-readable storage medium having encoded thereon computer-executable instructions that, when executed, cause a computer to perform a method for use in a computer system. The computer system comprises an event generating component that monitors activity in the computer system and generates one or more events in response to activity in the computer system and a plurality of event handling components that each applies at least one business process rule to determine at least one aspect of how the computer system should respond to an event. The method comprises an act of, for at least one first event, creating a first logical pool of event handling components from among the plurality of event handling components. The first logical pool of event handling components comprises at least two event handling components capable of handling the at least one first event by applying at least one business process rule to determine at least one aspect of how the computer system should respond to the at least one first event.

In a further embodiment, there is provided a computer system. The computer system comprises an event generating component that monitors activity in the computer system and generates one or more events of at least a first event type in response to activity in the computer system, and a first logical pool of two or more event handling components that each applies at least one business process rule to determine at least one aspect of how the computer system should respond to events of the first event type. In the computer system, for each event of the first event type, an event handling component of the first logical pool is notified of the event by the event generating component.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
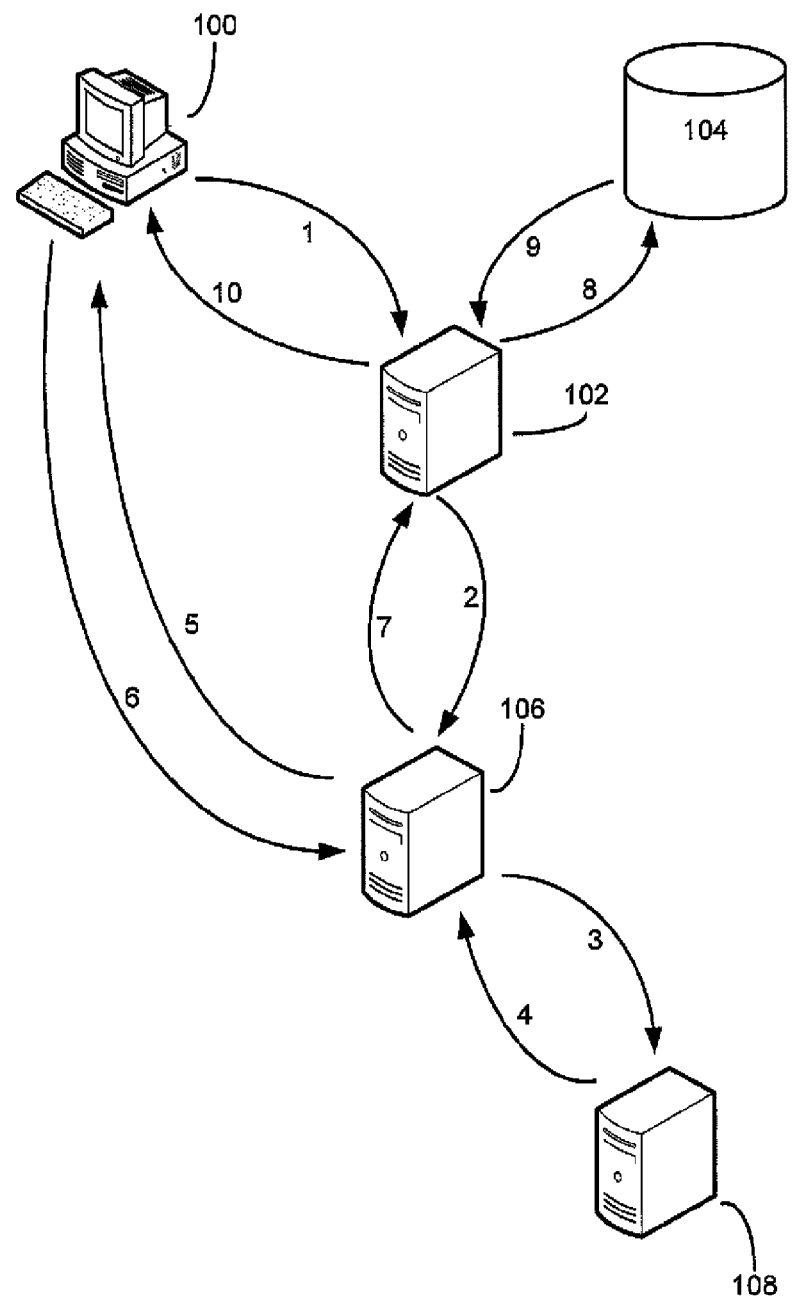
FIG. 1 is a diagram of a computer system implementing conventional operation-analysis techniques.

Computer systems, including a single computing device or multiple computing devices, may implement one or more event management techniques to govern how the system responds to one or more events. In accordance with these event management techniques, an event generation component monitors the activity in the computer system for the occurrence of a relevant event, and when one occurs, generates an event notification (sometimes referred to simply as an event) to an event handling component that determines how the event will be acted upon or "handled." For example, performance of a function or occurrence of any other activity may result in the generation of one or more events by event generation components, and the events may be handled by event handling components. The computer system may respond to the function or other activity in a manner specified by the one or more event handling components based on various factors.

The factors used by event handling components to determine how to respond to an event may be different for each event, each type of event, and/or each event handling component. In conventional event management techniques, an event generation component passes notification of the event to the event handling component, whereupon the event handling component analyzes the received information, determines what additional information about the event or about the context of the event is required to handle the event, and retrieves that additional information to enable it to handle the event.

Applicants have recognized and appreciated that these conventional approaches to event management are not efficient. In many computer systems implementing such conventional event management techniques, an event handling component may be required to retrieve the information it needs to determine how to handle an event from at least one and sometimes many different sources. Retrieving information from one or more sources may take a large amount of time, which delays the handling of an event until all information is retrieved. Additionally, in some systems, multiple event handling components may need to handle an event prior to a function being performed in response to the event, and each of these event handling components may need to retrieve information from one or more sources. The aggregate delay of each of these components creates even more inefficiencies in the system. Further, for some event handling components, the additional information required may be the same or similar to the information needed by others, and inefficiencies may also arise when these event handling components duplicate their information retrieval efforts.

In accordance with one embodiment of the invention, an event generation component provides to an event handling component not only notification of an event but also context information about the event, in the same communication. The context information may provide all the information necessary for the event handling component to apply one or more business policy rules to determine how to handle the event, such that the event handler does not need to request information from any other outside component—though in some implementations the event handling component may evaluate information stored in its own data stores (e.g., information regarding policies) in addition to the context information received with the event.

In some implementations that may be used in systems that include multiple different event handling components that evaluate different context information to determine how to handle the event, an event generation component may be adapted to provide in the same communication all the information needed by all of the different event handling components to make decisions on how to handle the event, rather than only the information needed by one event handling component or the specific event handling component to which the same communication is being transmitted. Accordingly, in some such implementations, the same communication having both the event notification information and the context information may be broadcast to all event handling components in a system, and each of these components may quickly handle the event according to the business policy rules by which the components may decisions, without the components each having to retrieve additional information to make these decisions.

Applicants have further recognized and appreciated that it may be desirable to provide event management techniques that enable event generation components to be configured to control an order in which different event handling components are notified of an event. As described above, in conventional event management techniques, events are detected (and a notification thereof provided to an event handling component) via a filter driver in the I/O stack of an operating system. When multiple event generating filter drivers are provided in an I/O stack (e.g., with different ones generating event notifications to different event handling components), the order in which they will process an event is determined by the order in which the filter drivers are positioned in the I/O stack. While some operating systems provide an ability to influence the order of filter drivers in the I/O stack by grouping sets of filter drivers into groups and having control over the order of the groups, such control is limited as there is no ability to control the order within a group. In addition, once the filter drivers are installed, their order in the I/O stack determines the order in which they will process all events, and there is no ability to configure the system to handle different events in different orders.

Applicants have appreciated, however, that in some cases, providing greater control over the configuration of event handling components is desirable. In accordance with some embodiments described herein, event management techniques are provided that enable an administrator to configure an order in which event handling components may handle an event. In accordance with one optional feature of this embodiment, the orders in which multiple event handling components may handle events can be configured differently for different events.

Further, Applicants have recognized and appreciated that conventional event management techniques typically operated with a single event handling component to process each event. The processing performed by each event handling component can be lengthy, and may make the event handling component unavailable during the process to handle other events. Applicants have appreciated that if events are being rapidly generated by an event generation component, these events may be stalled for handling by the bottleneck created by having the single event handling component. In accordance with some embodiments of the invention, event management techniques may be improved by offering multiple event handling components that are organized into logical pools to handle particular events.

The aspects of the invention relating to providing context with event notification, providing the ability to configure the order in which multiple event handling components process an event, and the creation of logical pools of multiple event handlers each can be implemented is any of numerous ways. Some illustrative implementations are described below, but it should be appreciated that none of these aspects of the invention is limited to any of the particular implementation techniques described below. In addition, in some implementations, all three of these aspects of the invention may be employed together. However, the invention is not limited in this respect, as any of these three aspects thereof can be implemented alone, or together in any combination of any two.

Figure 2A:
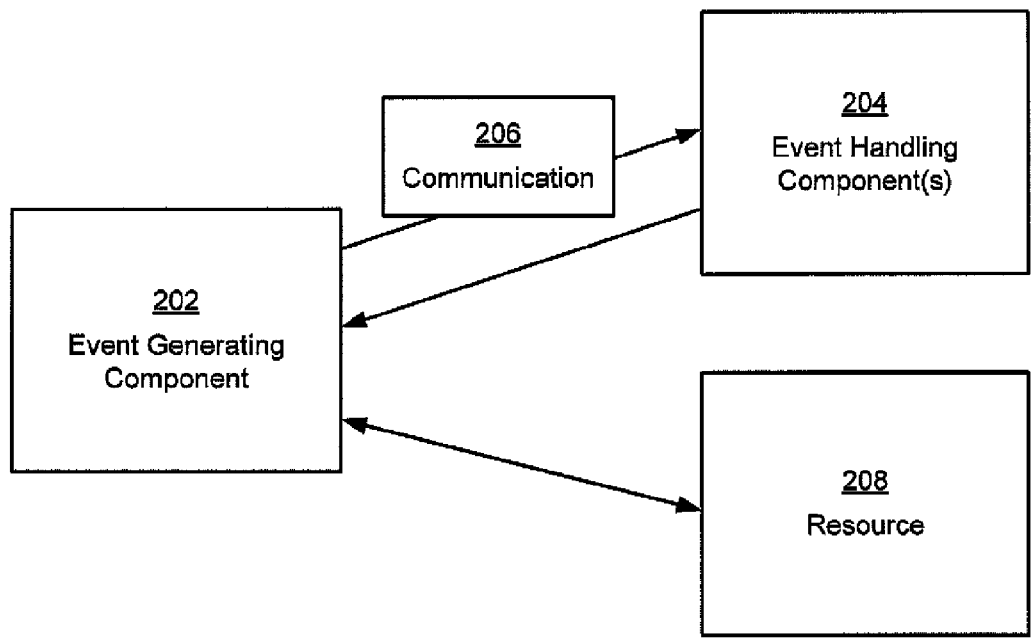
FIG. 2A is a block diagram of components of a system implementing event management techniques in accordance with some embodiments of the invention.

FIG. 2A is a block diagram of an event generation component that provides context information in accordance with one aspect of the invention. In the diagram of FIG. 2A, an event generation component 202 is provided to generate events that will be handled by an event handling component 204. The event may be a request of any type, as the embodiment of the invention that relates to security context information for an event is not limited to use with any type of event. For example, to perform an I/O operation to interact with a resource 208. It should be appreciated, however, that not all events may be associated with resources like resource 208, and that some systems may not feature a resource 208. The resource 208 may be any suitable component of a computing device or computer system, such as a network component or storage system from which the event generating component 202 desires information or to which the event generating component 202 desires to write information.

In one illustrative embodiment, the resource 208 is a Network Attached Storage (NAS) system that provides a file system interface to one or more clients to store data for the clients, and the events handling components may relate to a Content and/or Quota Management (CQM) application that monitors the use of the storage resources provided by the NAS storage system to one or more clients. However, this is merely an example, as the aspects of the invention are not limited to use in such an environment.

An event generation component 202, as used herein, is any suitable component of a computer system, including a computing device or a hardware and/or software component of a computing device, generates notification of any type of event in a computer system. An event may be any suitable trigger for one or more event handlers desires notification. For example, in the illustrative example where the event notification is provided to a CQM system monitoring storage in a NAS file system, an event may be a request from a particular client to write to a file, to write data of a particular size, to open a file, to read a file, etc.

In the exemplary system of FIG. 2A, information regarding the event, including about the event itself and about the context in which the event was generated, is passed by the event generation component 202 to an event handler 204 in a single communication. The event handling component can be any consumer of information (e.g., any component in a computer system) that desires information regarding an event. In some implementations, consuming the information regarding the event may comprise evaluating the information by applying one or more business process rules and, in some of these implementations, providing a response to the event generating component regarding the event. This response may comprise any suitable information, including an authorization for the event generating component 202 to perform one or more functions associated with the event, for example, interacting with the resource 208. For example, in the illustrated system including a NAS file system and a CQM system, when an event is triggered by a client seeking to access a file, the CQM system may apply business rules to determine whether the access is authorized (e.g., does the requesting client have access privileges, would a write result in a client exceeding the storage resources allotted to the client, etc.), and return an indication to the filter driver that generated the event of whether the requested access is authorized so that the filter driver may allow or prevent the access.

In another example where the event handler is an auditing system that tracks access to the NAS system, the auditing system may update its records based on the access but provide no return indication to the event generating component (e.g., a filter driver that generated the communication 206). This is merely an example, as the aspects of the invention can be used with any type of event handling.

As discussed above, when information regarding the event is transmitted from the event generation component to the event handling component, context information to be used by the event handling component to handle the event may be transmitted in the same communication.

In one embodiment, the communication 206 includes all the information about the context of the event that the event handling component 204 uses to handle the event so that it need not retrieve any additional information. However, it should be appreciated that all aspects of the invention are not limited in this respect, as it is contemplated that benefits can be achieved by providing event a subset of the context information to reduce the information the event handling component must retrieve to handle the event.

As used herein, a "same communication" or a "single communication" can be a single transmission or set of transmissions that transfer the context information necessary for the event handling component to handle the event without the event handling component issuing a request for any of the context information. In some cases, the same communication 206 may be multiple transmissions, including in the case where a single set of information for transmission is segmented or packetized into several distinct transmissions by a networking protocol such as the Transmission Control Protocol (TCP).

Figure 2B:
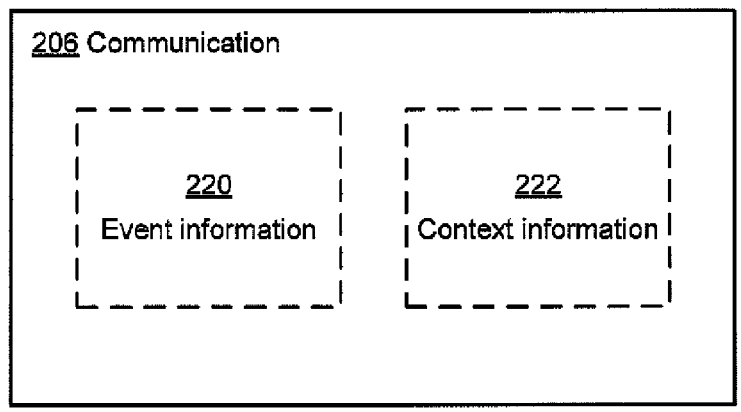
FIG. 2B is a block diagram of components of a same communication that may be exchanged between an event generating component and an event handling component in accordance with some embodiments of the invention.

As shown in FIG. 2B, the communication 206 may comprise event information 220 about the event itself as well as context information 222 about the context or environment in which the event was generated. Event information may be any suitable information about the event, and may vary depending on the exact event generated. Additionally, any suitable information may be provided as context information for an event. For example, context information may comprise information about one or more software modules generating the event, identification of a computing device on which the event was generated, identification of a user of the computing device, a time the event was generated, information on operations that led to generation of the event, or any other suitable information. In some implementations, the context information 222 contained in the communication 206 may be limited to all the information necessary for that event handling component 204 to make a decision on how to handle the event. In alternative implementations, however, the context information 222 include information used by multiple event handling components to handle the event, regardless of the specific event handling component to which the same communication 206 is being transmitted. Thus, for any specific event handling component 204, the communication 206 may include information it may not need to determine how to handle the event and any such information may simply be ignored by the event handling component 204. In one implementation discussed below, the event generating component 202 may be configured to provide event notification to different types of event handling components 204. For example, using the example of a CQM system for use with a NAS file system, multiple CQM systems may be provided by different vendors and each may respond to an event somewhat differently. For example, different CQM systems may desire different context information when making a decision about how to handle certain events. Thus, rather than requiring that separate event generating components 202 be configured for each different type of CQM system, one configuration can be employed that includes in the communication 206 the information desired by all the various CQM systems that are supported, so that any one may receive additional information it does not use and can disregard.

As discussed above, in accordance with another embodiment, a capability is provided to enable administrators to configure an event generation system to interact with event handling components in a specified order. This increases the flexibility of the system, as the event handling components can be ordered in any desired way (e.g., in a way that increases the throughput of the system). For example, event handling components that perform operations more quickly may be scheduled to the front of the order whereas components with longer operations may be placed in the back, components that affect the operations of other components may be placed in the front and components which are affected by other components may be placed at the back etc. These are merely examples as the event handling components can be configured in any desired order.

Accordingly, while in conventional systems an event handling component receiving notification of an event prompted by receipt of an I/O request (e.g., a server receiving a request from a client) would receive only that information which was provided in the I/O request, in some embodiments of the invention additional event and context information may be passed to an event handling component by an event generating component such that the event handling component is not required to seek out additional information to apply a business process rule for determining how to handle the event. For example, in conventional systems, for an event generated in response to an I/O request operation requesting creation of a file, an event handling component receiving notification of the operation would only receive information contained within an Input/Output Request Packet (IRP) generated by the client and transmitted to a server. The IRP packet may include information on security settings for the file to be generated, such as attributes of the file, an indication of a share status for the file, and various other options relating to the file. In some file systems, a file system server may impersonate a client when performing operations on behalf of the client, such as when accessing data on a NAS system. In such systems, the IRP may also include instructions to the server on how and whether it should impersonate the client when creating the file—including what security parameters the server should use when executing the operation to create the file—and various security options for the to-be-created file such as access permissions. This security information is collectively termed "security context" information for the IRP. It should be appreciated, however, that the "security context" information of the IRP is not the same as the context information described herein.

As used herein, context information is information that is used by an event handling component to apply one or more business process rules regarding how to handle an event. This context information may include any suitable information used by an event handling component, such as information about the environment in which the event was generated, or any other type of context information. In the IRP, the "security context" is merely instructions regarding how an operation associated with the event should be carried out, or properties of a file desired to be generated. This "security context" information is therefore not context information as used herein, as it is not used by an event handling component to apply one or more business process rules. Examples of the types of context information 222 that may be included in the communication 206 include a full and/or relative file path for a file associated with an event, if there is a file associated with the event; an identifier for a file system server associated with the event, if there is a server associated with the event; an identifier for a data store associated with the event, such as a network-accessible shared folder of a file system in which a file associated with the event is stored; an identifier for a user that is performing an operation that generated an event; an identifier for a user that is an owner of a file with which an event is associated; a size of a file associated with an event at the time the event was generated; a name of a file associated with an event; a type of access to a file desired by a user (e.g., read, read/write, etc.); for a create file operation, an identifier for an action to take if the desired file already exists (e.g., replace existing file, abort, etc.); an Internet Protocol (IP) address of a client computing device and/or file system server associated with the event; a time at which the event occurred; or any other types of information that may be used by an event handling component to apply one or more business process rules. It should be appreciated that this listing of exemplary types of context information is merely illustrative of the various types of information that may be used as context information, and that others are possible.

In another embodiment, logical pools of multiple event handling components may be formed as described in greater detail below, which may increase the throughput of the system by increasing the number of event handling components that are able to handle a particular type or types of events. Further, by having multiple components handling a particular type of event, if one component fails then another component is still available to handle the event to increase the fault tolerance of the system. As discussed above, the aspects of the present invention can be implemented in any of numerous ways. Some illustrative implementations are described below, but it should be appreciated that the aspects of the invention described herein are not limited to these implementations and can be implemented in other ways.

Figure 3A:
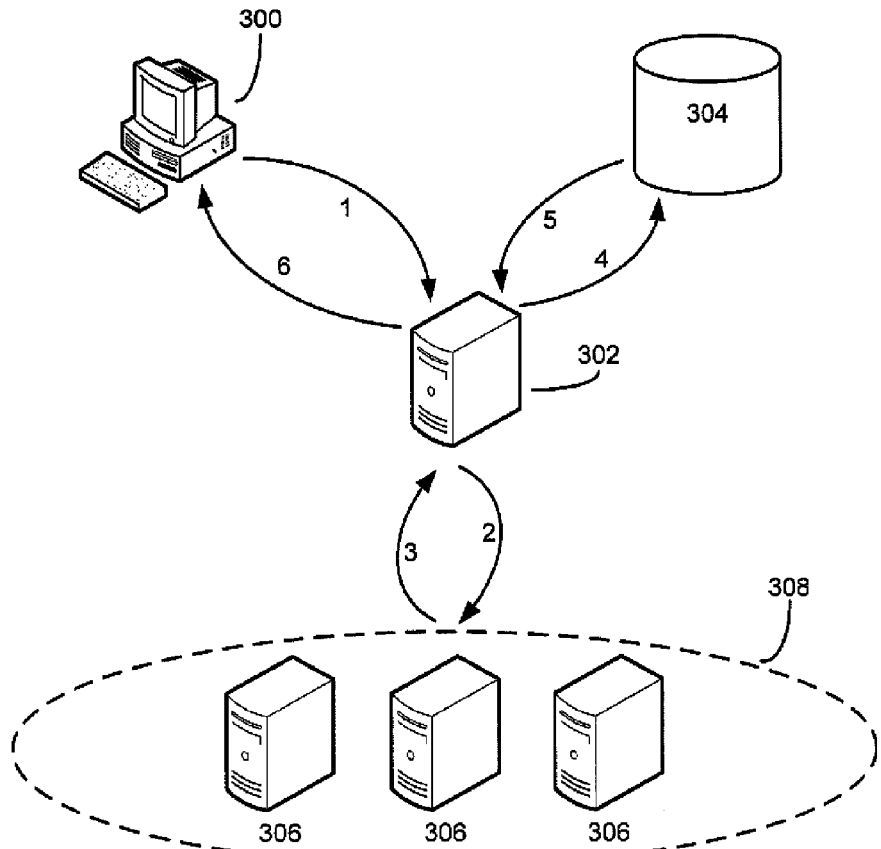
FIG. 3A is a diagram of a computer system in which event management techniques operating according to some embodiments of the invention may act.
Figure 3B:
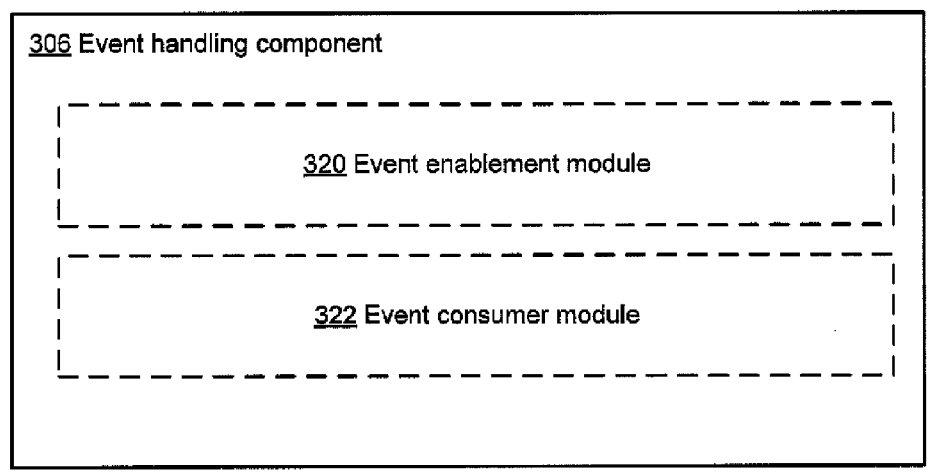
FIG. 3B is a block diagram of some components of an event handling component in which some embodiments of the invention may act.

FIGS. 3A and 3B show exemplary computer systems in which the techniques described herein may operate. As discussed above, however, it should be appreciated that techniques operating in accordance with principles described herein can be implemented in any suitable computer system comprising any suitable number and type(s) of computing devices, including any suitable number and type of network resources. Other implementations, however, may operate in any other suitable computer system. Similarly, some of the illustrative examples are for use in dealing with events generated in a NAS storage system for a CQM or audit system. It should be appreciated, however, that the principles described herein may be implemented in any of various environments and computer systems, as embodiments of the invention are not limited to application to any particular context.

The exemplary computer system shown in FIG. 3A implements a data storage system in which a client 300 performs various operations to access a data store 304. The operations may comprise read and/or write operations, as well as any other operations that may be executed by a client interacting with a data store. Data storage systems can be implemented in any of various ways, including many ways known in the art, any of which may be suitable systems in which to implement event management techniques in accordance with embodiments of the invention.

In the example of FIG. 3A, a file system server 302 is provided as an interface by which the client 300 may access the data store 304. The file system server 302 may have one or more data stores having metadata about the allocation of storage units on the data store 304 to one or more content units, such as files. To access a particular file stored on the data store 304, the client 300 may transmit a request to the file system server 302, which, upon receiving the request, may consult the metadata about the allocation of the data store 304 to determine which storage units (e.g., which data blocks) of the data store 304 are related to the file, and then may perform access operations on those storage units. For example, if the access requested by the client 300 is a read operation for a file, the file system server 302 may consult its metadata to determine the storage units storing the data for the file, may request the data stored in those storage units from the data store 304, and provide the data to the client 300.

As mentioned above, storage systems such as these may be operated in any of various ways. In one implementation, the client 300, file system server 302, and data store 304 may be computing devices attached to a communication network over which the devices exchange information. The client 300 may be implemented to pass requests for operations via a networking protocol such as the Common Internet File System (CIFS) or Networked File System (NFS) to the file system server 302. The file system server 302 may implement a Network-Attached Storage (NAS) file system of any type, an example of which is any of the products from the Celerra file system products available from the EMC Corporation of Hopkinton, Mass. The file server 302 may receive the requests from the client 300, process them by, for example, interacting with the data store 304, and return responses to the client 300. These requests may take any suitable form. For example, a CIFS request may be structured as an Input/Output Request Packet (IRP) containing various information about the operation requested by the client 300. The information contained in the IRP may include any suitable information about a requested operation, and may vary depending on the operation.

The computer system of FIG. 3A may be adapted to perform event management techniques in accordance with any of the embodiments described herein. As discussed above, in event management techniques an event generation component generates events that are handled by an event handling component. In the example of FIG. 3A, the file system server 302 may be implemented as the event generating component or a portion thereof, and the event handling component can be any of numerous other aspects of a computer system that may desire to be notified (via an event) of activity in the file system. In several illustrative examples described below, the event handling component may relate to a CQM system and/or an auditing system, but these are merely examples, as events can be generated for any other reason.

Upon receiving a request from the client 300, the file system server 302 may detect that the request should be evaluated by an event handling component and may generate an event in response. Aggregated information regarding the event (and in some embodiments the context of the event) may then be transmitted in the same communication to at least one event handling component 306. The event handling component 306 may use the information contained within the communication (optionally with information from other sources) to evaluate one or more business policy rules to determine how to handle the event. In the embodiment wherein all the context information is provided in the communication, the event handling component need not request additional information about the event from the computer system. Once it is determined how the event is to be handled, in some implementations the file system server 302 may then perform the data access operation requested by the client 300 in accordance with instructions received from the event handling component 306. For example, the instructions from the event handling component 306 may be an indication of whether the operation should be permitted or denied, and if permitted the file system server 302 may perform the operation.

Event handling components 306 may be implemented in any suitable manner. FIG. 3B shows one exemplary implementation that may be used in data storage systems, but it should be appreciated that others are possible. In the example of FIG. 3B, an event handling component 306 comprises two sub-components: an event enablement module 320, and an event consumer module 322. In this example, an event enablement module 320 may be provided to receive communications regarding events from the event generation component and may pass them off to the event consumer module 322. The event consumer module 322 may perform one or more actions based on business policy rules of the consumer. The modules 320 and 322 may execute on the same computer or different computers. The event enablement modulate 320 comprises a framework that is associated with the event generating component of the file system server 302, and the event consumer modulate 322 is an application specific module that can work together with the event enablement module 320 to determine how to handle an event in accordance with any particular functionality of a particular event handling component. Modularizing the event handling component in this manner provides advantages for third party vendors seeking to provide the capability to handle events generated by the system server 302, in that the particular protocols and interfaces for communicating with the event generating component in the file system server 302 can be handled by the event enabling module 320 and essentially be transparent to the event consumer module 322, thereby simplifying the implementation of the event handling component 306 for a third party vendor. However, it should be appreciated that the aspects of the present invention described herein are not limited in this respect, and that an event handling component 306 need not be modularized in this manner.

The event handling component 306 (or the event consumer module 322 of FIG. 3B) may be adapted to apply at least one business process rule when handling the event. Any suitable actions can be taken by an event handling component 306 to handle an event. In the context of the data storage system of FIG. 3, actions could include auditing actions, which may include tracking and storing information regarding accesses of information (e.g., which users accessed information and at what time) by monitoring read/write operations to the data store 304; indexing actions, which may include tracking changes to information over time and updating an index of information stored in data store 304 by monitoring write operations to data store 304; backup actions, which may include retrieving and storing original copies of information stored in data store 304 prior to overwrite of the information by new write operations through monitoring for new write operations; content management actions, which may enforce content management policies through monitoring read/write and/or open operations to determine whether a user requesting the operation is permitted to perform the operation; and quota management actions, that may enforce quota policies on files, sets of files and/or storage capacity used by monitoring read and/or write operations. This list of actions is merely illustrative of the types of actions that may be taken by event handling components; others are possible It should be appreciated that, as mentioned above, the exemplary computer system of FIGS. 3A and 3B is merely illustrative of the various types of computer systems that may be implemented in accordance with the principles described herein, and that others are possible. For example, where in FIG. 3A the file system server 302 is described as the event generating component, in alternative implementations a combination of the file system server 302 and the event enablement module 320 may be considered the event generating component, and the event consumer module 322 considered the event handling component. Such implementations may be used, for example, where multiple event consumer modules 322 are implemented on a single computing device, and each notified by a common event enablement module 320.

Figure 4:
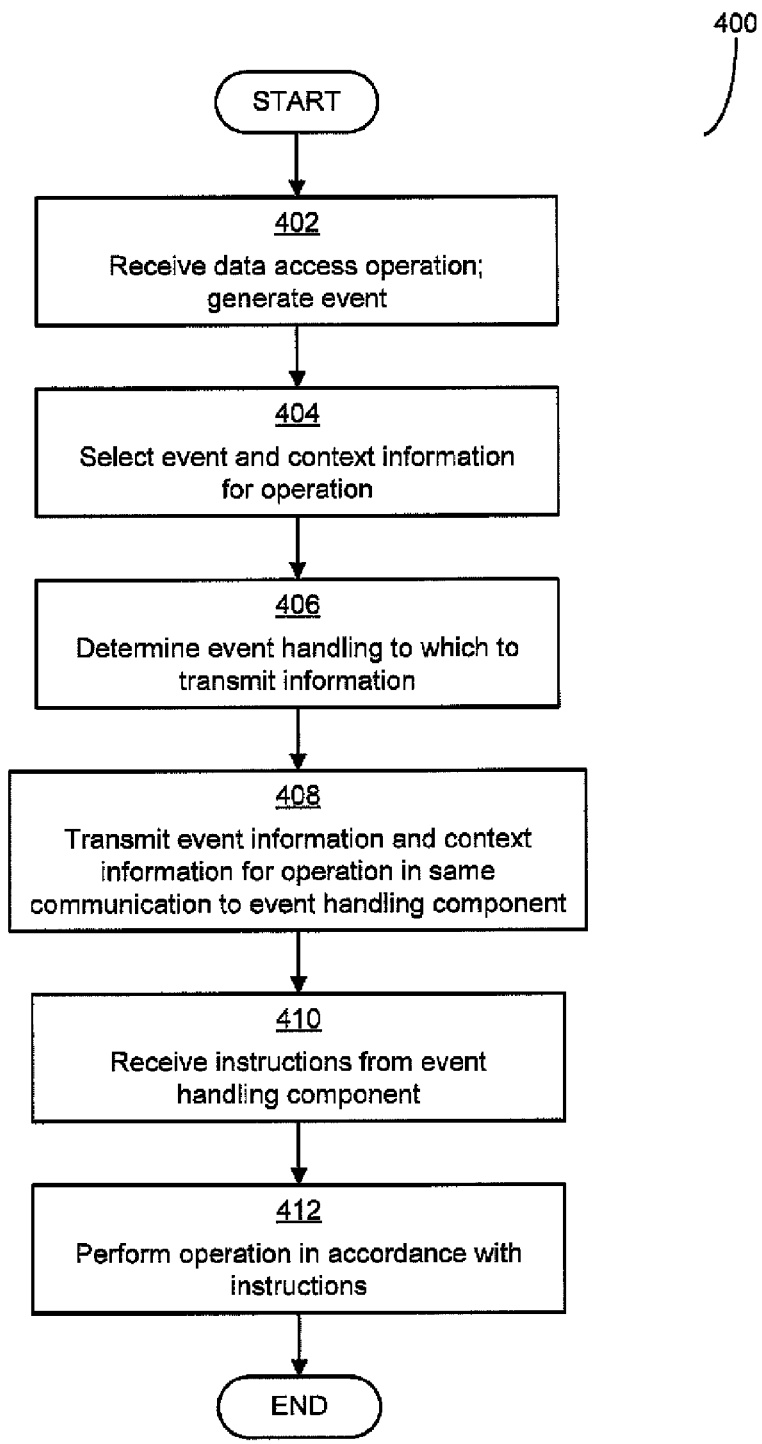
FIG. 4 is a flowchart of an exemplary process for operating an event generating component in accordance with some embodiments of the invention.

The event management techniques described herein may be implemented in any suitable manner. FIG. 4 shows one illustrative technique for operating an event generation component that may be implemented in accordance with some embodiments described herein, but others are possible as embodiments of the invention are not limited to implementing the specific process shown in FIG. 4. Further, the exemplary process 400 may be described with reference to the computer system of FIGS. 3A and 3B implementing a NAS file system, but it should be appreciated that the event management techniques described herein may be applied to any suitable environment.

The exemplary process 400 begins in block 402, wherein the file system server 302, receives a request for performance of a data access operation from the client 300. Upon receiving the request, the file system server 302 may detect that the request has been received and that the operation requested is one for which an event should be generated to be handled by an event handling component. This many be done in any suitable manner. For example, in some implementations the file system server 302 may have a detection module such as a filter driver implemented in the driver stack that evaluates incoming communications from, for example, a communication network to determine whether the communications are requests for the file system server 302 to perform data access operations. As discussed above, in some implementations the requests may be implemented as CIFS IRPs, and in such implementations the detection module may be implemented to examine incoming communications for CIFS IRPs.

In block 404, upon generating the event, the event generation component aggregates event and context information about the requested operation. The event information may be any suitable information to notify an event handling component about the acceptance of the event. The context information may be any suitable information describing the environment in which the event was generated, and that the event handling component may desire to reach a determination about how to handle the event. For example, the context information may comprise information on a computing device requesting the operation (in this case, client 300), the user requesting the operation (the user of client device 300), a time of the operation, and/or any other suitable information. This event and context information may be retrieved from any suitable source depending on the information to be retrieved, including from the client 300 and from other components of the computer system such as an authentication server providing information on identities of the client 300 and a user of the client 300. In some implementations, information may be aggregated based on an event handling component to which the information is intended to be sent, such that all the information necessary for that event handling component to handle the event is included in the aggregated information transmitted in the same communication. As discussed above, all aspects of the present invention are not limited in this respect, as in some embodiments a subset of the context information to be used by an event handling component in determining how to handle an event may be provided in the same communication that notifies the event handling component of the event to minimize the information that the event handling component must request to determine how to handle the event.

As discussed above, in accordance with one embodiment of the present invention, the context information assembled in block 404 for an event may comprise information that is not customized for any particular event handling component to enable it to make a determination about how to handle the event, but rather, may be an aggregation of information desired by a number of different event handling components (e.g., provided by different vendors) so that when an event occurs, the event generating component need not concern itself with the peculiar requirements of any particular event handling component, but simply always act consistently and collect context information that can be employed by any suitable event handling component.

In accordance with one embodiment of the present invention, it is contemplated that the event generating component may be configured to support a number of different event handling components provided by different vendors, and may be made aware of the context information that each of those vendors employs when making a determination about how to handle a particular event. Thus, the event handling component can be configured to collect all of the context information provided by the full set of vendors that it is configured to support and provide all of that context information and provide it with notification that an event has occurred. In this manner, when an event occurs, the event generating component need not concern itself with what particular event handling component(s) are installed on the system and only the context information customized for that particular event handling component. Instead, the event generating component may collect the same context information irrespective of what event handling components are installed on the system. Of course, it should be appreciated that the aspects of the present invention described herein are not limited in this respect, and that in alternate embodiments of the invention, context information may be customized for only the event handling component(s) installed on the system or to which the context information is being transmitted.

Upon aggregating the event and context information in block 404, the event generation component 302 determines in block 406 one or more event handling components 306 to which the aggregated information should be transmitted. This may be done in any suitable manner. In some implementations, there may be a single event handling component for the event generating component, and that event handling component is selected. In other implementations, as described above, where multiple event handling components are to be informed of an event, an administrator of a computer system may impose an ordering on the notification to the multiple event handling components, and determining in block 406 an event handling component to which to transmit the information may comprise retrieving and examining information regarding the configured ordering, then selectively transmitting information to the event handling components in the order mandated by the ordering.

Alternatively, other techniques may be used in other implementations. For example, different event handling components may be implemented for different categories of events, and determining in block 406 to which component to transmit the information may comprise determining a type of the event. For example, in some implementations events may be categorized as a pre-event, post-event, or post-event fail. A "pre-event" may be an event generated prior to the performance of some function, task, or operation. For example, a pre-event may be an event generated prior to performance of a write operation in a data storage system. A "post-event" may be an event generated subsequent to the performance of some function, task, or operation. For example, a post-event may be an event generated after a write operation in a data storage system has been performed. Lastly, a "post-event fail" may be an event generated subsequent to the attempted performance of some function, task, or operation that failed during performance. For example, a post-event fail event may be an event generated after a write operation in a data storage system was attempted, but did not succeed, and may be used as a signal to roll back any changes that may have been made as a result of a pre-event generated prior to the operation. In some implementations, different event handling components 306 may be implemented for different categories of events, and the event generation component may maintain information of event handling components 306 associated with each of the categories. Based on the event type and the information, the event generation component may then select an event handling component to which to transmit the same communication.

In another embodiment, determining in block 406 to which event handling component 306 the event and context information should be transmitted may comprise determining which of a logical pool 308 of event handling components 306 should be notified. As discussed above, in some implementations, multiple event handling components 306 may be joined in a logical pool 308 to share processing duties by each handling a portion of the events which are to be handled by the logical pool 308. In some such cases, each of the event handling components 306 may include an individual event consumer module 322 that interacts with several event enablement modules 320 on the other event handling components 306. In other implementations, the event handling components 306 may each comprise an event consumer module 322 that interact with one another by, for example, writing to and reading from the same data store. In implementations which have logical pools, determining to which of the components of the logical pool 308 the aggregated information should be transmitted may be done in any suitable manner, such as by any suitable load balancing technique including a simple round-robin.

In still other implementations, determining in block 406 to which event handling component 306 to transmit the information may comprise transmitting the information to all event enabling modules 320 in a computer system, and having the event enablement modules 320 use information maintained by those modules to determine which event consumer modules 322 are to be notified of the event, and in what order the event consumer modules 322 should be notified. In some such implementations, the event consumer modules 322 may register with the event enablement module 320 for events or types of events for which they seek notification, and selecting, by the event enablement module 320, of an event consumer module 322 to which to transmit the communication of an event may comprise reviewing information of the registrations received from the event consumer modules 322.

Regardless of the manner in which the one or more event handling components 306 are selected as the recipient(s) in block 406, in block 408 the aggregated event and context information is transmitted to the selected recipient(s) in block 408 in the same communication. As discussed above, it should be appreciated that transmitting the information in the same communication does not mean that the information is necessarily transmitted in a single transmission, but rather means that the event handling component(s) receiving the communication receive the information included herein without being required to request any information. The information included in the same communication may take any suitable structure. For example, in some implementations the information may be encoded into an Extensible Markup Language (XML) format prior to being transmitted, but other techniques may be employed.

In block 410, the event generation component receives instructions from the event handling component 306 on how to process further the event. The instructions may be any suitable notification from the event handling component regarding the handling of the event. For example, for a data access operation classified as a "pre-event" the instructions may comprise instructions to perform or not to perform the operation to access the data store 304. In block 412, the event generation component performs the operation in accordance with the instructions received in block 412, and the process 400 ends.

In the illustrative embodiments shown in FIG. 4, it is the event generation component that receives instructions from the event handling component about how to handle the event, and the event generation component may then communicate with any other aspect of the computer system to implement such instructions. However, it should be appreciated that not all aspects of the present invention are limited in this respect. For example, in some implementations, the event handling component may directly instruct other aspects of the computer system in how to handle a particular event, and need not provide such instructions to the event generation component.

Figure 5:
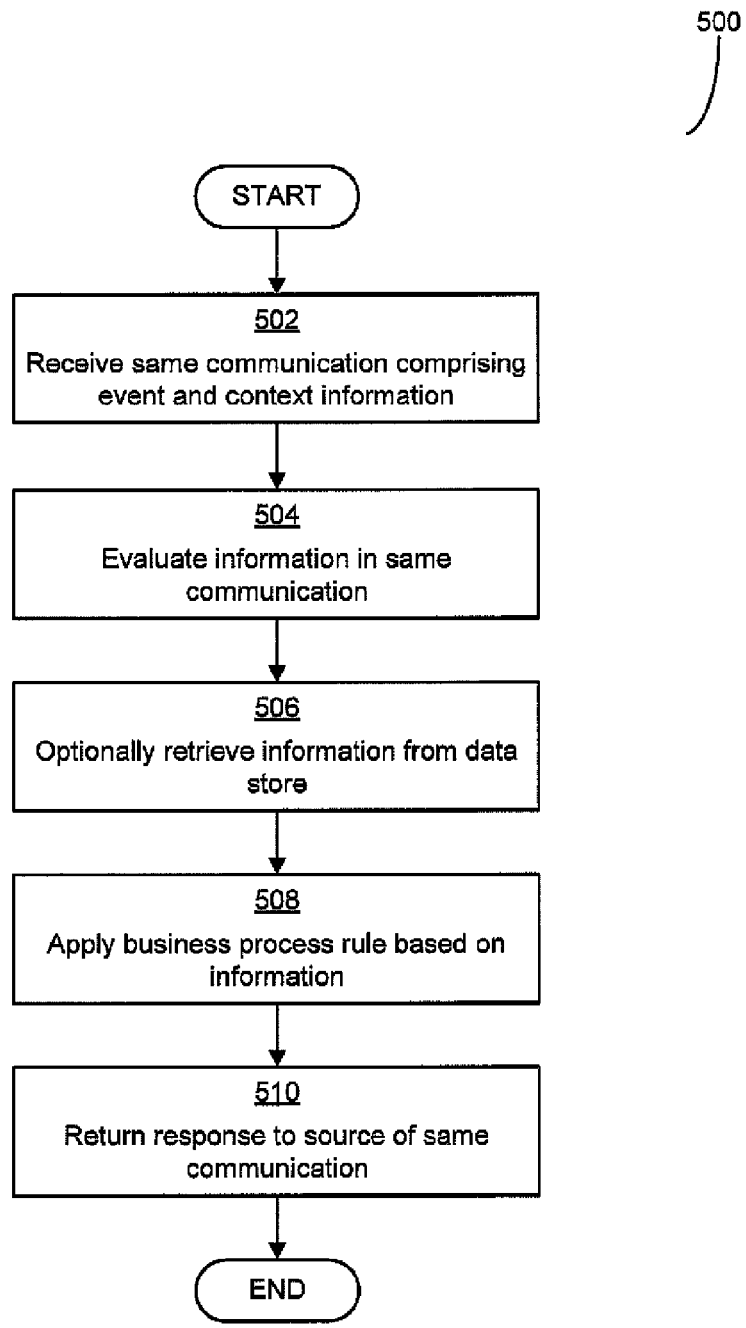
FIG. 5 is a flowchart of an exemplary process for operating an event handling component in accordance with some embodiments of the invention.

FIG. 5 shows a flowchart of an illustrative process 500 for operating an event handling component in accordance with some embodiments. As with the illustrative process 400 of FIG. 4, the process 500 will be described in terms of the computer system of FIG. 3A that employs a NAS file system, but it should be appreciated that the process 500 can be implemented in any of various computing systems. Further, it should be appreciated that the process 500 is merely exemplary of the types of processes that may be implemented by event handling components in accordance with some embodiments of the invention and that others are possible.

The process 500 begins in block 502, wherein the event handling component receives from the event generation component a communication comprising event and context information (e.g., the communication transmitted in block 408). In block 504, the event handling component evaluates the event and context information to determine how it should handle the event. For example, the event handling component may evaluate the event information to determine the type of event before it determines how to handle it. In block 506, the event handling component optionally may retrieve information stored in data store associated with the component, such as information regarding policies to be enforced by the event handling component. In block 508, one or more business process rules are applied by the event handling component based on the information received in block 502 and retrieved in block 506. Applying the one or more business process rules may be done in any suitable manner, including taking one or more actions in accordance with the business process rule(s).

It should be appreciated that, as described above, the only information used by the event handling component to apply the business rules is that received in the same communication from the outside or retrieved from a data store associated with the event handling component. In applying the business process rule(s), the event handling component does not request or retrieve any additional information regarding the event or the context of the event, nor any other particular information which may be used in handling the event. However, as mentioned above, not all aspects of the present invention described herein are limited to receiving in a same communication notification of an event and all context information to be used by the event handling component to determine how the event should be handled, as some embodiments may receive only a subset of the information to be used by the event handling component and may then retrieve other context information, and other embodiments (e.g., those directed to providing the ability to configure the order in which multiple event handling components may process an event and a creation of logical pools of multiple event handlers) are not limited in any respect by what information is provided in a communication notifying the event handling component of an event.

In block 510, in accordance with the application of the business process rule in block 508, a response is returned to the event generation component and/or any other suitable component in the computer system. This response may include any suitable information, including instructions on how the event generation component or other aspects of the system should perform one or more operations to handle the event. Following transmission of the response, the process 500 ends.

Figure 6:
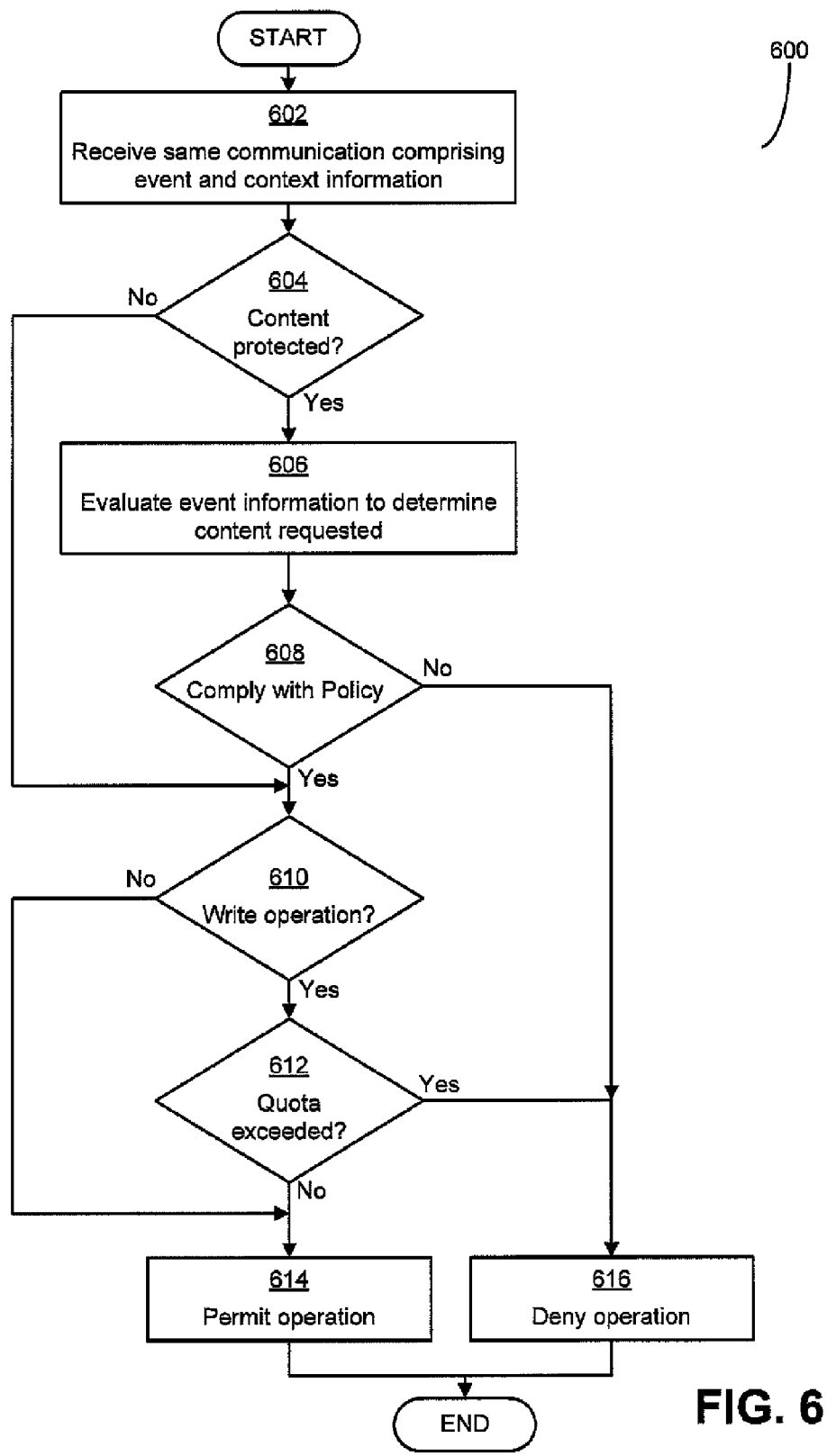
FIG. 6 is a flowchart of an exemplary process for operating an event handling component that applies at least one business process rule related to content and quota management (CQM) that may be implemented in accordance with some embodiments of the invention.

The process 500 is a generic process that may apply to many of the embodiments of the invention. A more specific process that may be used in one implementation is shown in FIG. 6 and will again be described in the context of the exemplary computer system of FIG. 3A that includes a NAS file system. As discussed above, an event handling component may carry out any of various actions relating to various business process rules. In one example for use with a NAS system and CQM and/or auditing systems, illustrative actions include auditing actions, indexing actions, backup actions, content actions, and quota actions, among others. FIG. 6 shows a flowchart of an illustrative process 600 for performing specific actions in accordance with business process rules based on the information. In this example, the event handling component may perform actions including content and quota management actions. As should be appreciated from the foregoing, these actions are merely illustrative, as the aspects of the present invention described herein are not limited to use with event handling components that perform any particular actions when implementing a CQM and/or auditing system, and are not limited to that handling component associated with a CQM and/or auditing system at all.

The process 600 begins in block 602, wherein a communication notifying the event handling component of an event and including context relating thereto is received from the event generation component. Upon receiving the communication comprising the event and context information from the event generation component, the event handling component may in block 604 retrieve one or more event handling policies maintained by the event handling component and determine whether the event results from an attempt to access protected content.

In a CQM system, such event handling policies may include any suitable content policies that relate to usage of content in any of various ways. For example, content policies may stipulate that only certain users may access certain files, that only certain operations may be performed on certain files, that certain users may only perform certain operations, and/or any other set of suitable rules.

When it is determined at block 604 that the event results from an attempt to access protected content, the process proceeds to block 606, wherein the event handling component may evaluate the information in the same communication to determine properties of the event, and may compare the properties of the event to the content policies maintained by the event handling component. For example, for a write operation that seeks to store a new file in a specified directory of a file system, the event handling component may evaluate the context of the event and compare it to the content policy regarding one or more files or sets of files stored on the data store 304 and determine whether the user requesting the write operation has permission to store files in the specified directory. In one embodiment, this evaluation may be done based on the information contained in the communication received in block 602 and on the policies, and not on any other information retrieved by the event handling component, as the event and context information contained in the communication are sufficient to make the determination. The event handling component 606 may then make a determination in block 608 as to whether the event complies with the policy for the desired action. If not, the operation may be denied in block 616 by transmitting a response, as in block 510, to the event generation component indicating the denial, and the process ends.

If the operation is permitted by the at least one content policy, then the process may proceed to block 610 to determine whether the event violates quota policies. Quota policies may set any suitable limit on content. For example, the quota policy may set quotas for amounts of disk space that may be taken up by files of specific types (e.g., MP3 music files), of individual users, of teams of users, or any other suitable quotas. The event handling component 306 may determine whether a write operation would result in any of the quotas being exceeded by the data store. If not, then the operation may be permitted, but if so, the operation may be denied. Thus, block 610, the event handling component initially examines the event information to determine whether the event is a request to perform a write operation. If not, then a quota may not be exceeded, and the operation is permitted in block 614 by transmitting a response to that effect as in block 510, and the process ends. If it is determined in block 610 that the event relates to a write operation, the process proceeds to block 612 wherein the content about the write operation (e.g., an amount of information requested to be stored by the write operation, a type of file being written, the user who issued the write, etc.)—is evaluated to determine whether the addition of the information requested by the operation in the event would violate the at least one quota maintained by the component. If not, then the operation may be permitted in block 614 and the response transmitted. If, however, the quota would be exceeded, then the operation is denied in block 616 and a response generated to that effect, and the process ends.

As discussed above, in some implementations, multiple event handling components 306 may be provided to handle a particular type or types of event generated by one or more event generation components in different ways. This may be done in any of various ways. For example, each of these event handling components 306 may be implemented on the same or on separate computing devices. As discussed above, in some circumstances, providing information to the multiple event handling components in a specific order may be desired (e.g., in the interests of more efficient and/or less wasted communication). Thus, in accordance with one embodiment, an administrator is provided with the ability to configure the order in which an event is handled by multiple event handling components for any desired reason.

Figure 7:
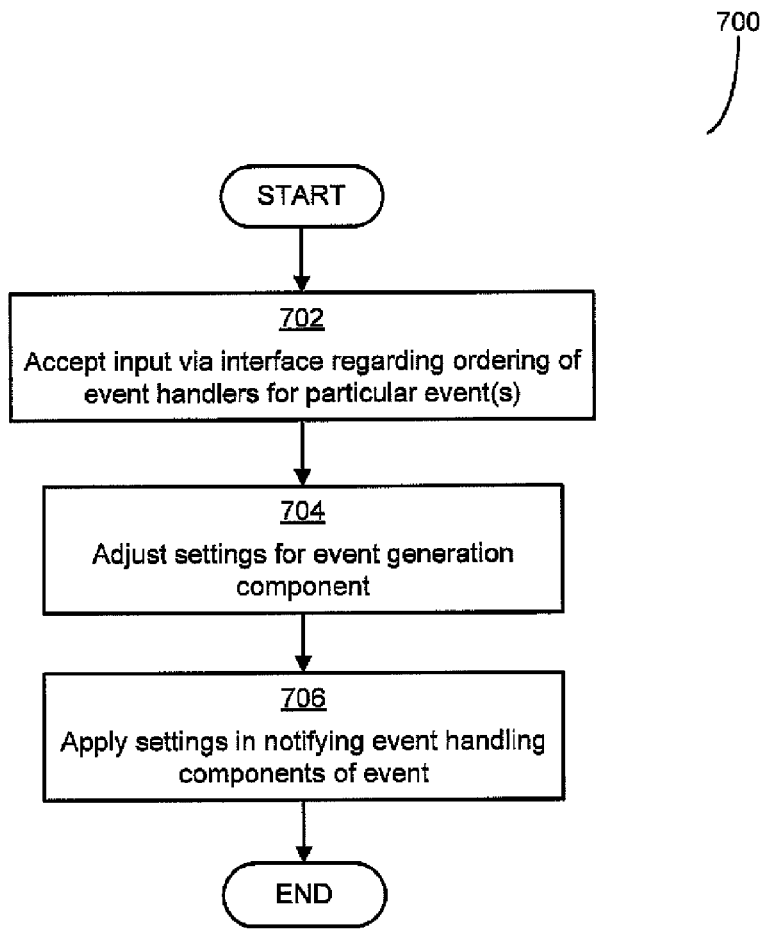
FIG. 7 is a flowchart of an exemplary process for imposing an order on how multiple event handling components are notified of an event in accordance with some embodiments of the invention.

FIG. 7 shows one exemplary process 700 for ordering the notification of event handling components by an event generation component in accordance with some embodiments. The process 700 begins in block 702, wherein the event generation component receives input via an interface regarding an ordering in which event handling components should be notified for one or more particular events or event types. The ordering may specify that one or more components are notified in parallel, serially, or in any other manner, and may include a prioritization to dictate that some components may be notified before others.

Ordering may be applied to any suitable set of one or more events based on any suitable characteristic(s). The events may be events relating to any suitable function or operation, may be events of any type (e.g., "pre-event" or "post-event" event types), or events which are managed by specific actions. For example, events may be selectively ordered based on whether they are affected by quota management actions (e.g., write operations) or auditing actions (e.g., read/write operations). The interface via which the input ordering is accepted can be any suitable interface, such as an Application Programming Interface (API) accessible locally or over a network via a message-passing protocol, a graphical user interface, or any other interface.

In block 704, the settings for an event generation component are adjusted based on the input received in block 702. The settings may be stored in any suitable manner, including in a data store associated with the event generation component and available to the event generation component either locally or remotely.

In block 706, the settings stored in block 704 are applied in selecting and notifying event handling components of an event (e.g., as in blocks 406 and 408 of FIG. 4), and the process ends.

As mentioned above, one application for the aspects of the present invention described herein is for use in a computer system including a NAS file system, wherein the event generation component may be a file system server (e.g., server 302) and wherein event handling components may be modularized as shown in FIG. 3B, with the event enabling module being implemented on the same or different computing devices than the file server. In some such computer systems that have a distributed event generation component, an ordering of the notifications of event handling components may be managed on a central portion, such as the file system server. In other computer systems, however, the ordering may be managed in a distributed manner by a plurality of event enablement modules 320, on different computing devices. Such an implementation may be useful in systems in which an event enablement module 320 is associated with multiple event consumer modules 303 each of which is to be notified of an event.

Logical pools of event handling components may also be provided in accordance with some embodiments. An illustrative implementation of logical pools is illustrated in FIG. 3, wherein multiple event handling components 306 are arranged in a logical pool 308. Thus, when an event generation component is seeking to notify an event handling component 306 of an event, multiple different options are available. Among the advantages offered by such a technique is fault tolerance, as if one event handling component is removed from the system, such as by a crash, others are still reachable. In addition, increased throughput may be achieved through being able to distribute a workload among multiple event handling components.

The aspect of the present invention that relates to the use of logical pools can be implemented in any simple manner, as this is not limited to any particular implementation techniques. In accordance with one embodiment of the present invention, the event handling components 306 that may be grouped into logical pools may be modularized as shown in FIG. 3B. However, it should be appreciated that the aspect of the present invention that relates to the use of logical pools is not limited in this respect, and can be employed with event handling components that are not modularized. As discussed above, when one or more event handling components are modularized, each can include its own dedicated event enablement module 320 and event consumer module 322, or alternatively, two or more event handling components can share a single event enabling module 320 that communicates with multiple distinct event consumer modules 322. In accordance with one implementation, two or more event handling components 306 that are organized into a logical pool may share the same event enablement module 320, or may employ separate event enablement modules 320, as the aspects of the present invention described herein are not limited in this respect.

Dynamically, in some implementations, multiple event enablement modules 320 may be configured into logical pools of event handling components. In accordance with this embodiment, an event enablement module 320 is not permanently associated with an event consumer module 322. Rather, the event enablement module 320 has the ability to be dynamically associated with consumer module 322 upon start-up and be configured by the event consumer module 322. Such an implementation allows for easier expansion or reduction of various logical pools at different times (e.g., to react to the load being handled by various logical pools at different times).

Figure 8:
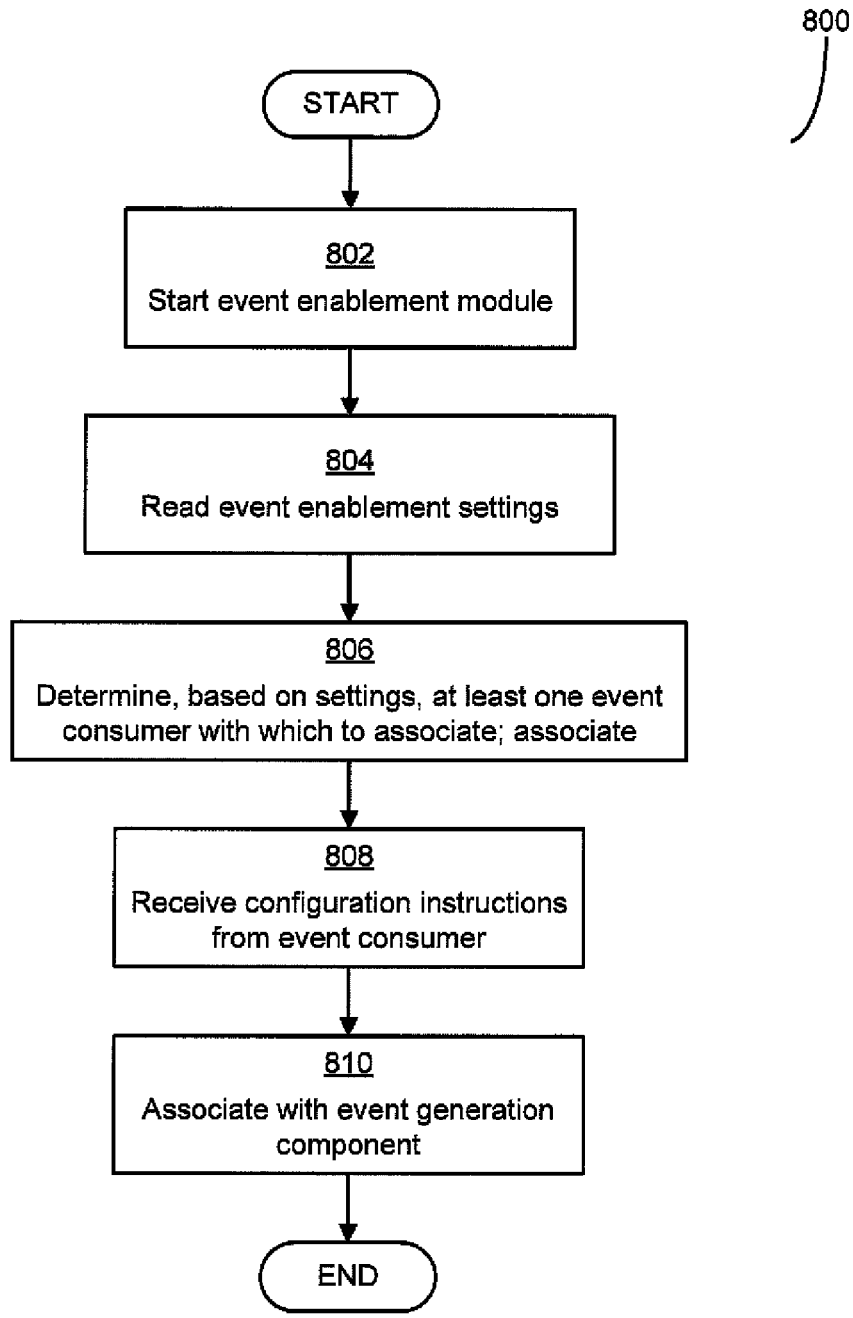
FIG. 8 is a flowchart of an exemplary process for joining an event handling component to a logical pool of event handling components in accordance with some embodiments of the invention.

FIG. 8 shows one example of such a process for adding an event enablement module 320 to a logical pool of event handling components. It should be appreciated, however, that the process 800 is merely exemplary, and that other processes are possible.

Process 800 begins in block 802, wherein an event enablement module is started. This may comprise powering-on a computing device hosting the event enablement module, requesting that the hosting computing device begin executing the event enablement module, or any other suitable action. In block 804, the event enablement module reads one or more event enablement settings that may be provided for (e.g., having been configured by an administrator) by the module. These settings may include settings regarding one or more event consumer modules executing either on the same or on remote computing devices and how to contact the event consumer modules to associate with them (e.g., may include an IP address of a computer on which the event consumer module is executing), as well as on an event generation component with which to associate.

In block 806, the event enablement module determines, based on the settings, at least one event consumer with which to associate and associates with the event consumer module(s). Then, in block 808, the event enablement module receives configuration information from an event consumer module regarding how the event enablement module is to interact with that consumer. The configuration information may comprise any suitable information, including an indication of a type or types of events of which the event enablement module should notify the consumer when received from the event generation component; for example, events associated with a particular type of operation, events associated with a particular storage unit, etc.

In block 810, the event enablement module, according to the settings, associates with an event generation system and registers with the event generation component as part of a logical group. This may be done in any suitable manner, such as by transmitting to the event generation component an identifier for the logical group with which the event enablement module wishes to associate.

The process illustrated in FIG. 8 is merely one illustrative technique for configuring an event handling system. Other techniques may additionally or alternatively be implemented.

Figure 9:
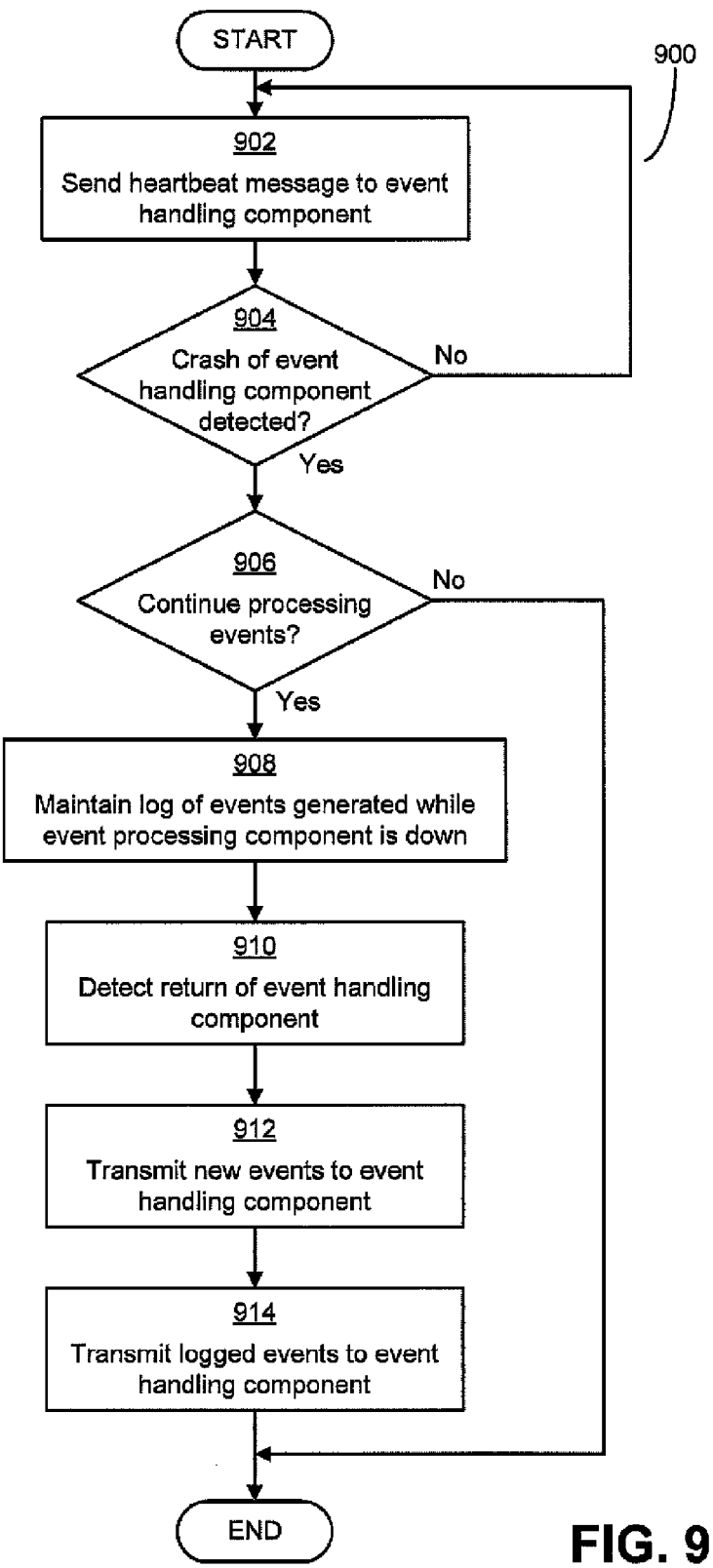
FIG. 9 is a flowchart of an exemplary process for performing event management techniques when an event management component is unreachable in accordance with some embodiments of the invention.

FIG. 9 illustrates one example of a process for providing fault tolerance using a plurality of event handling components, though it should be appreciated that others are possible. The process of FIG. 9 begins in block 902, wherein during a communication session between an event generation component and an event handling component in which multiple events are handled and multiple communications sent, a heartbeat message is periodically sent to the event handling component by the event generation component to ensure that the event handling component is still functioning. Typically, the event handling component would acknowledge the heartbeat message and respond that it is still functioning. It could therefore be determined in block 904 that the event handling component has not crashed, and the process returns to block 902 to send another heartbeat message. However, when it is determined in block 904, that the event generating component detects that the event handling component is nonresponsive (e.g., possibly because of a crash)—that is, the event handling component may not have responded to the heartbeat message—the process proceeds to block 906. In block 906, it is determined whether the event generation component should continue to process events and perform functions associated with events. This determination may be made in any of numerous ways, depending on the computer system in which the process is implemented. For example, in a data storage system, this may comprise determining whether clients should still be allowed to access a data store without the events being handled by event handling components. In some implementations, determining whether events should continue to be processed may depend on the type of event handling component that has crashed. For example, if the event handling component was one handling events to determine whether the events violated content policies, it may be determined that security risks are too great to permit continued processing of events without the events being handled, and the continued processing may be disallowed. On the other hand, if the event handling component that crashed was one performing indexing actions to ensure quick searching of the data store 304, then it may be determined that the crashed event handling component is not critical and events may continue to be processed. These are merely examples, and a system can be configured to determine whether to continue processing an event in any suitable manner, as the aspects of the present invention described herein are not limited to use with systems that are configured in this respect in any particular manner.

If it is determined in block 906 that events may not be processed, then the process ends and the event generating component does not generate any more events. If, however, it is determined in block 906 that events may continue to be processed, then the event generating components continue to perform functions and operations associated with events (for example, performing data access operations requested by clients) and in block 908 a log of the events that were generated is maintained as the functions and operations are performed. This log may be maintained in any suitable manner, such as by writing all of the information that would have been transmitted in the same communication regarding the event into a data store associated with the event generating component.

In block 910, the event generating component detects a return of the event handling component that was previously detected as crashed in block 904—such as when the event handling component acknowledges a heartbeat message—and reassociates with the event handling component. In block 912, the event generation component transmits event and context information for new events in the manner disclosed above, to the event handling component, to ensure that new events are handled properly as quickly as possible, and the backlog of un-handled events does not grow. In block 914, then, the log of events is transmitted to the event handling component such that the event handling component can handle the logged events, if desired by an administrator of the system. Handling the logged events may be performed in any manner, such as by a separate process of the event handling component than the new events or by the same process during downtime when new events are not being generated. After the logged events have been handled, the event management system may be considered to be fully synchronized, and the process ends with the event generation component and the event handling component exchanging information regarding events as usual, according to any of the exemplary techniques described above or variations on those techniques.

Techniques operating according to some or all embodiments of the invention may be implemented in any suitable manner. For example, in some embodiments, the techniques may be implemented as computer-executable instructions encoded on one or more computer-readable storage media such as magnetic media (e.g., a hard disk drive), a Compact Disk (CD), a Digital Versatile Disk (DVD), a persistent or non-persistent solid-state memory (e.g., Flash memory, Magnetic RAM, etc.), or any other suitable storage media. The computer storage media may be implemented as computer-readable storage media 1006 of FIG. 10 or computer-readable storage media 1106 of FIG. 11 (i.e., as a portion of a computing device 1000 or computing device 1100) or as a separate computer storage medium. It should be appreciated that, as used herein, a "computer-readable medium," including "computer-readable storage medium," refers to tangible storage media having at least one physical structure that may be altered in some way during a process of recording data thereon. For example, a magnetization state of a portion of a physical structure of a computer-readable medium may be altered during a recording process.

In some such embodiments, the computer-executable instructions implementing the techniques operating in accordance with the principles described herein may be implemented as one or more stand-alone functional modules (e.g., the resolution module described above). As described above, a "functional module" is a structural component of a system which performs a specific operational role, however instantiated, which may be a portion of or an entire software element (e.g., a function or a discrete process). Generally, functional modules include routines, programs, objects, components, data structures, etc. that perform particular tasks or implement particular abstract data types. Typically the functionality of the functional modules may be combined or distributed as desired in various embodiments. These functional modules may, in some implementations, be adapted to interact with other, unrelated functional modules and/or processes, such as functional modules implementing a software program application or implementing an operating system for a computing device, or, in other implementations, the modules may be adapted to interact with other functional modules which, together with the modules, form an overall system such as an operating system such as the Celerra Data Access in Real Time (Celerra DART) operating system, available from the EMC Corporation of Hopkinton, Mass. (In other words, the functional modules may be implemented alternatively as a portion of or outside of an operating system.) It should also be appreciated that, in some implementations, some functional modules may be implemented separately from others, and functional modules implementing some of the techniques described above may not be implemented.

In some, but not all implementations, the techniques may be embodied as computer-executable instructions that may be executed on any suitable computing device(s) operating in any suitable computer system, including the exemplary computer system of FIG. 3A. These computer-executable instructions may be implemented in any suitable manner, including as a number of functional modules, each providing one or more operations needed to complete execution of such techniques. Each functional module may be implemented in its own way; all need not be implemented the same way. As used herein, a functional module is a structural component of a system that performs an operational role. The operational role may be a portion of or an entire software element. For example, a functional module may perform a function of a process, a discrete process, or any other suitable unit of processing. A functional module may comprise computer-executable instructions, and may be encoded on a computer storage medium. Additionally, such computer-executable instructions may be written using any of a number of suitable programming languages and/or programming or scripting tools, and also may be compiled as executable machine language code or intermediate code that is executed on a framework or virtual machine. Functional modules may be executed in parallel or serially, as appropriate, and may pass information between one another using a shared memory on the computer on which they are executing, using a message passing protocol or in any other suitable way.

Exemplary functional modules are described below carrying out one or more tasks, though it should be appreciated that the functional modules and division of tasks described is merely illustrative of the type of functional modules that may implement the exemplary techniques described herein, and that the invention is not limited to being implemented in any specific number, division, or type of functional modules. In some implementations, all functionality may be implemented in a single functional module. Further, the functional modules are discussed below, for clarity, as all executing on one or two computing devices, though it should be appreciated that, in some implementations, the functional modules may be implemented on many separate computing devices adapted to communicate with one another.

These functional modules may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 10:
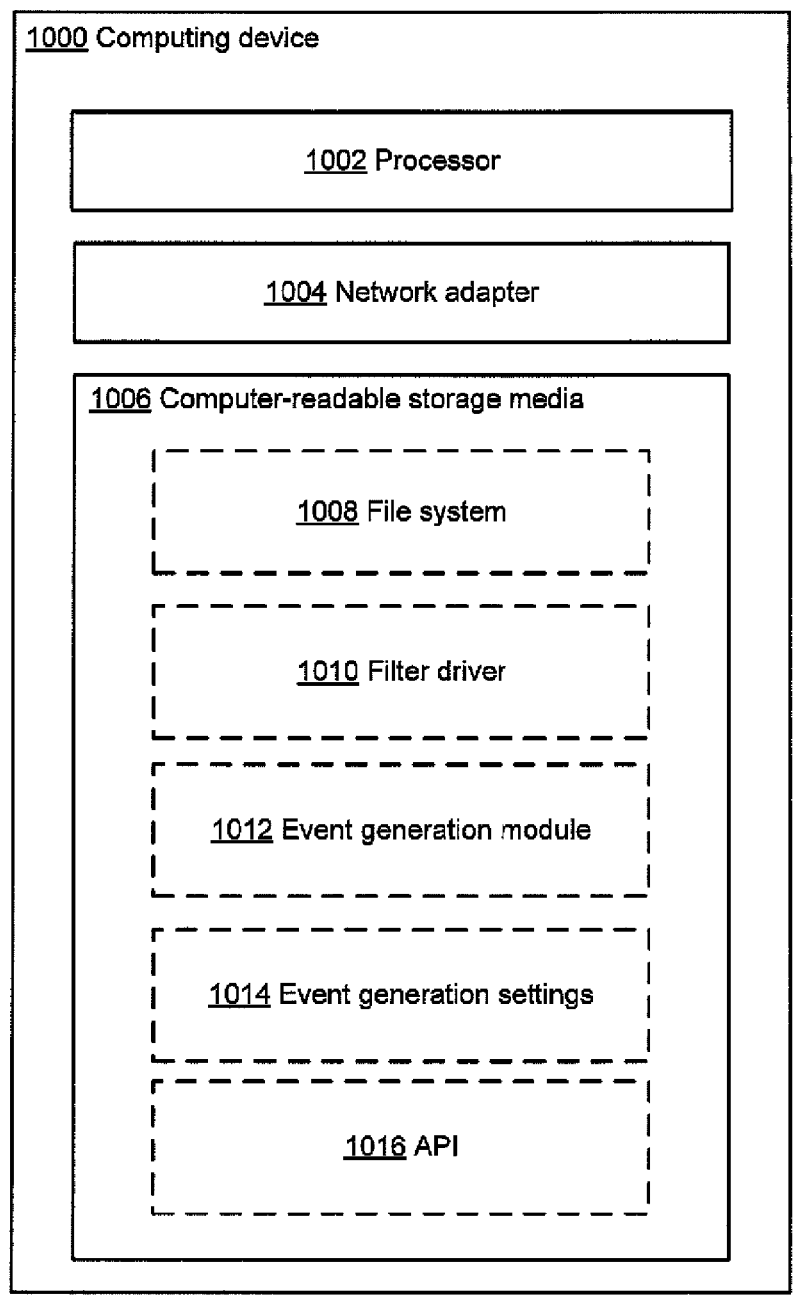
FIG. 10 is a block diagram of one exemplary computing device that may operate as an event generating component in accordance with some embodiments of the invention.
Figure 11:
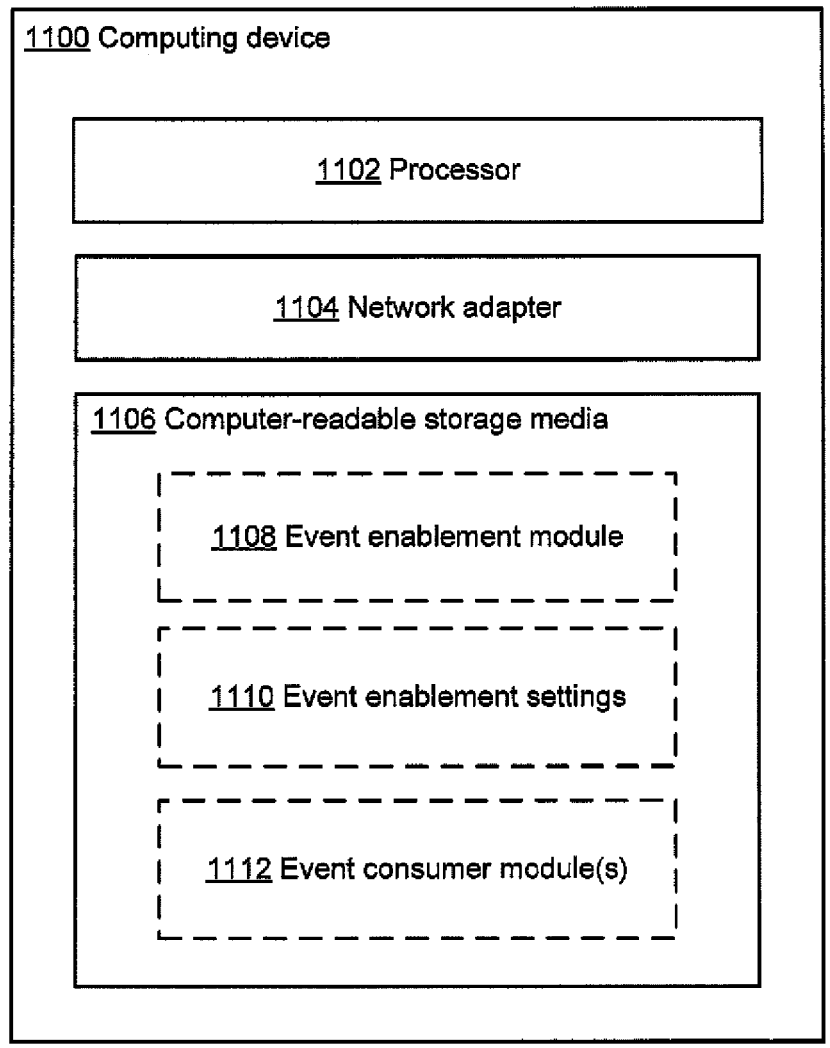
FIG. 11 is a block diagram of one exemplary computing device that may operate as an event handling component in accordance with some embodiments of the invention.

FIGS. 10 and 11 illustrates exemplary implementations of computing device in the form of computing device 1000 and computer device 1100 that may be used in a system implementing the techniques described herein, although others are possible. Further, it should be appreciated that FIGS. 10 and 11 are intended neither to be a depiction of necessary components for computing devices to operate in accordance with the principles described herein, nor a comprehensive depiction.

Computing device 1000 may be implemented, in some systems, as an event generating component or a portion thereof. In some such systems, such as data storage systems, the event generating component may include a file system server, but in alternative embodiments may be any suitable computing device adapted to generated events. Computing device 1000 may be, for example, a server, a mainframe, a desktop or laptop personal computer, a workstation, or any other suitable computing device. As shown in FIG. 10, computing device 1000 may comprise a processor 1002, a network adapter 1004, and computer-readable storage media 1006. Network adapter 1004 may be any suitable hardware and/or software to enable the computing device 1000 to communicate with any other suitable computing device over any suitable computing network. The computing network may be any suitable wired and/or wireless communication medium or media for exchanging data between two or more computers, including the Internet. In some implementations, network adapter 1004 may be implemented as two or more separate network adapters, offering connectivity via two or more types of network interfaces (e.g., a wired network adapter such as an Ethernet adapter and a wireless network adapter such as an IEEE 802.11g adapter). Computer-readable storage media 1006 may be any suitable tangible storage medium adapted to store data to be processed and/or instructions to be executed by processor 902. Processor 1002 enables processing of data and execution of instructions. The data and instructions may be stored on the computer-readable storage media 1006 and may, for example, enable communication between components of the computing device 1000.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various modules and storing various information as described above. Computer-readable storage media 1006 may store data and instructions relating to a file system 1008, which may include records on how data related to files managed by the file system 1008 are stored on a remote data store such as data store 304. Computer-readable storage media 1010 may also store instructions relating to a filter driver 1010 that may be implemented by the computing device 1000 to evaluate information being received by the network adapter 1004 and determine whether the information is related to one or more events that should be generated in response to receipt of the information. Generating events may then be done by an event generation module 1012 in accordance with event generating settings 1014, instructions and data for which may also be stored on the storage media 1006. Computer-readable storage media 1006 may further comprise instructions relating to one or more interfaces, such as an Application Programming Interface (API) 1014, that may be used to configure the event generation module 1012. Configuration may include, for example, imposing an order on the manner in which event handling components are notified by the event generating component, in accordance with one or more of the techniques described above or variants thereof.

Computing device 1100 may be implemented, in some systems, as an event handling component or a portion thereof. Computing device 1100 may be, for example, a server, a mainframe, a desktop or laptop personal computer, a workstation, or any other suitable computing device. As shown in FIG. 11, computing device 1100 may comprise a processor 1102, a network adapter 1104, and computer-readable storage media 1106. Network adapter 1104 may be any suitable hardware and/or software to enable the computing device 1100 to communicate with any other suitable computing device over any suitable computing network. The computing network may be any suitable wired and/or wireless communication medium or media for exchanging data between two or more computers, including the Internet. In some implementations, network adapter 1104 may be implemented as two or more separate network adapters, offering connectivity via two or more types of network interfaces (e.g., a wired network adapter such as an Ethernet adapter and a wireless network adapter such as an IEEE 802.11g adapter). Computer-readable storage media 1106 may be any suitable tangible storage medium adapted to store data to be processed and/or instructions to be executed by processor 902. Processor 1102 enables processing of data and execution of instructions. The data and instructions may be stored on the computer-readable storage media 1106 and may, for example, enable communication between components of the computing device 1100.

The data and instructions stored on computer-readable storage media 1106 may comprise computer-executable instructions implementing techniques which operate according to the principles described herein. In the example of FIG. 11, computer-readable storage media 1106 stores computer-executable instructions implementing various modules and storing various information as described above. Computer-readable storage media 1106 may store data and instructions relating to an event enablement module 1108 that accepts input via the network adapter 1104 from one or more other components of a computer system, such as computing device 1000 functioning as an event generating component. The event enablement module 1108 may then evaluate received information about events—including event information and context information contained in the same communication—based on one or more event enablement settings 1110 stored in the computer-readable storage media 1106. The event enablement settings 1110 can include any suitable settings, such as records indicating which event consumer module(s) 1112 should be notified for particular events and/or an order in which the event consumer module(s) 1112 should be notified. The computer-readable storage media 1006 may further store data and instructions relating to one or more event consumer module(s) 1112, which may include data regarding one or more policies that may be used by the consumer module when applying one or more business process rule(s) as well as instructions regarding one or more actions that may be taken when applying the rules.

Figure 12:
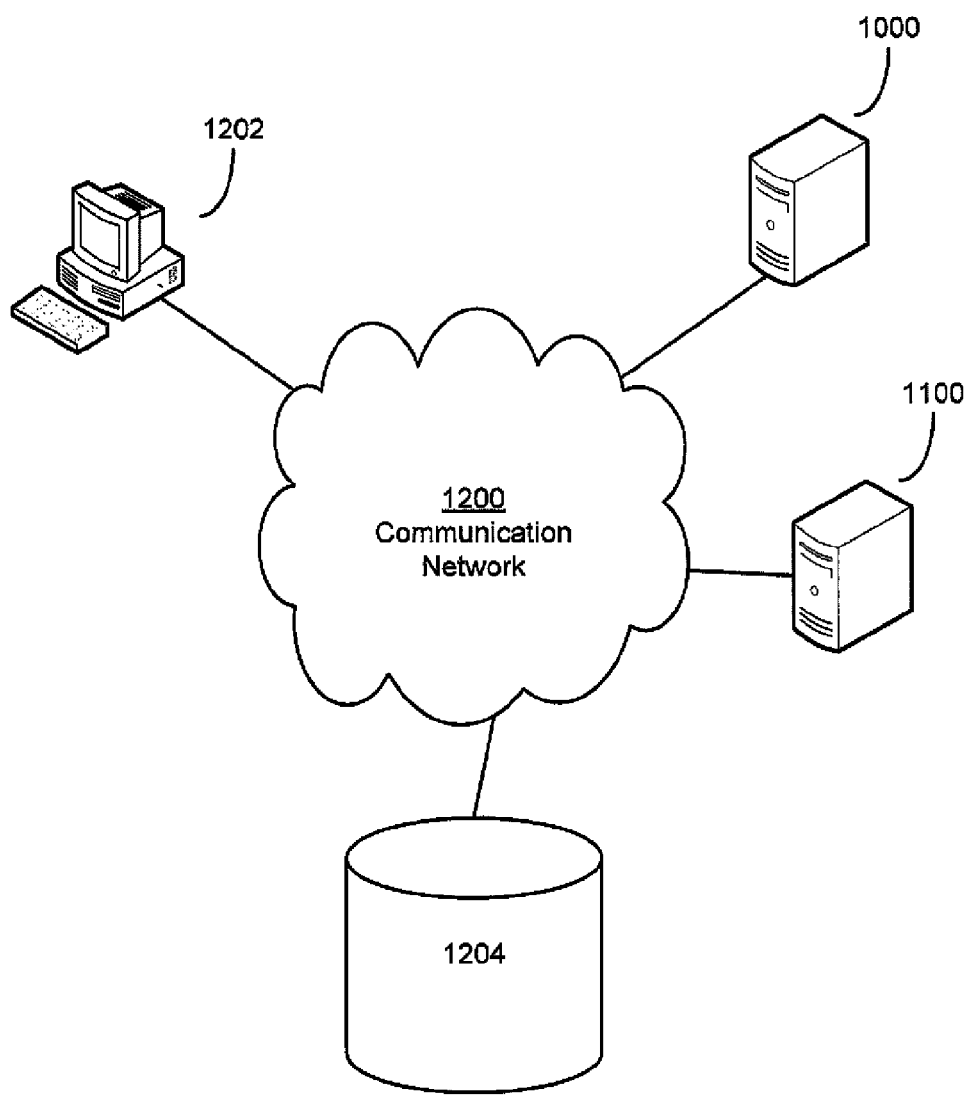
FIG. 12 is a block diagram of an exemplary computer system in which techniques operating according to some embodiments of the invention may act.

Computing device 1000 and computing device 1100 may operate in any suitable computer system. FIG. 12 shows one example of a computer system in which these devices may act. As before, the system of FIG. 12 may be described in terms of and may feature components of a data storage system, but it should be appreciated that event management techniques implemented in accordance with principles described herein may be implemented in any of various environments.

The computer system of FIG. 12 includes a communication network 1200 over which the computing devices 1000 and 1100 may exchange information. Communication network 1200 may be any suitable network or combination of networks, including any suitable wired and/or wireless network. Communication network 1200 may be the Internet, a Wide Area Network (WAN), a Local Area Network (LAN), or any other suitable network over which computing devices may exchange information. Also connected to the communication network 1200 in FIG. 12 is a client computing device 1202. In a data storage system, the client computing device 1202 may issue requests for one or more data access operations to be performed. The client computing device 1202 may transmit requests to the computing device 1000, in this case a file system server, in a suitable format relating to the data storage system. For example, the request may be a CIFS IRP communication. The file system server 1000, as an event generating component, may generate an event upon receiving the request, and transmit over the communication network 1200, to the computing device 1100 acting as an event handling component, event information and context information in the same communication regarding the event. The computing device 1100 may then evaluate in any suitable manner the event using the information contained in the same communication, and may respond to the computing device 1000 over the network with any suitable response. The computing device 1000 may then perform one or more operations in accordance with the response, which may include accessing a Network-Attached Storage (NAS) unit 1208 to retrieve information desired by the client computing device 1202, and then return a response to the client computing device 1202.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in a computer system comprising an event generating component that monitors activity in the computer system and generates one or more events in response to activity in the computer system and a plurality of event handling components that each applies at least one business process rule to determine at least one aspect of how the computer system should respond to an event, the method comprising:

for at least one first event, creating a first logical pool of event handling components from among the plurality of event handling components, the first logical pool of event handling components comprising at least two event handling components capable of handling the at least one first event by applying at least one business process rule to determine at least one aspect of how the computer system should respond to the at least one first event;

determining that a first of the event handling components of the first logical pool has failed, wherein the first event handling component that failed handles events in connection with client requests to perform operations on a data store;

responsive to determining that the first event handling component has failed, determining whether to continue to process subsequent events that perform operations to access the data store without the subsequent events being handled by event handling components, wherein if the first event handling component that failed handles events to determine whether an event violates content policies, it is determined to disallow continued processing of the subsequent events without the subsequent events being handled by event handling components; and wherein the method further comprises:

in response to occurrence of the at least one first event, selecting one of the at least two event handling components in the first logical pool to handle the at least one first event;

creating the first logical pool of event handling components to handle a first type of event; and forming a second logical pool of event handling components to handle a second type of event.

2. The method of claim 1, further comprising sending notification of the at least one first event to the one of the at least two event handling components selected in said selecting.

3. The method of claim 2, wherein said sending comprises sending notification of the at least one first event only to the one of the at least two event handling components selected in said selecting so that notification of the at least one first event is not sent to any of the at least two event handling components not selected in said selecting.

4. The method of claim 1, wherein each of the event handling components comprises an event enabler and at least one event consumer, wherein the event enabler is a framework configured to receive events from the event generating component and to provide at least some of the received events to the at least one event consumer.

5. The method of claim 4, wherein the at least two event handling components of the logical pool each comprise an event enabler and each are in communication with a common event consumer.

6. The method of claim 4, wherein the event enabler is configured to notify a first event consumer of the at least one event consumer of a first event and configured to notify a second event consumer of the at least one event consumer of a second event.

7. The method of claim 1, wherein subsequent client requests to access the data store are disallowed if the one event handling component that failed performs processing to determine whether events violate content policies of the data store.

8. At least one computer-readable storage medium having encoded thereon computer-executable instructions that, when executed, cause a computer to perform a method for use in a computer system comprising an event generating component that monitors activity in the computer system and generates one or more events in response to activity in the computer system and a plurality of event handling components that each applies at least one business process rule to determine at least one aspect of how the computer system should respond to an event, the method comprising:

for at least one first event, creating a first logical pool of event handling components from among the plurality of event handling components, the first logical pool of event handling components comprising at least two event handling components capable of handling the at least one first event by applying at least one business process rule to determine at least one aspect of how the computer system should respond to the at least one first event;

determining that a first of the event handling components of the first logical pool has failed, wherein the first event handling component that failed handles events in connection with client requests to perform operations on a data store;

responsive to determining that the first event handling component has failed, determining whether to continue to process subsequent events that perform operations to access the data store without the subsequent events being handled by event handling components, wherein if the first event handling component that failed handles events to determine whether an event violates content policies, it is determined to disallow continued processing of the subsequent, events without the subsequent events being handled by event handling components; and wherein the method further comprises:
in response to occurrence of the at least one first event, selecting one of the at least two event handling components in the first logical pool to handle the at least one first event;

creating the first logical pool of event handling components to handle a first type of event; and forming a second logical pool of event handling components to handle a second type of event.

9. The at least one computer-readable storage medium of claim 8, wherein the method further comprises:
sending notification of the at least one first event to the one of the at least two event handling components selected in said selecting.

10. The at least one computer-readable storage medium of claim 9, wherein said sending comprises sending notification of the at least one first event only to the one of the at least two event handling components selected in said selecting so that notification of the at least one first event is not sent to any of the at least two event handling components not selected in said selecting.

11. The at least one computer-readable storage medium of claim 8, wherein selecting one of the at least two event handling components in said selecting comprises determining which of the at least two event handling components is a least-recently-used event handling component, and selecting the least-recently-used event handling component to handle the event.

12. A computer system comprising a computer readable medium having code stored thereon, the computer readable medium including code for:
an event generating component that monitors activity in the computer system and generates one or more events of at least a first event type in response to activity in the computer system;

a first logical pool of two or more event handling components that each applies at least one business process rule to determine at least one aspect of how the computer system should respond to events of the first event type, wherein for each event of the first event type an event handling component of the first logical pool is notified of the event by the event generating component;

determining that a first of the event handling components of the first logical pool has failed, wherein the first event handling component that failed handles events in connection with client requests to perform operations on a data store;

responsive to determining that the first event handling component has failed, determining whether to continue to process subsequent events that perform operations to access the data store without the subsequent events being handled by event handling components, wherein if the first event handling component that failed handles events to determine whether an event violates content policies, it is determined to disallow continued processing of the subsequent events without the subsequent events being handled by event handling components; and wherein the computer readable medium further comprises code for:
in response to occurrence of the one or more events, selecting one of the two or more event handling components in the first logical pool to handle the one or more events;

creating the first logical pool of two or more event handling components to handle the first event type; and forming a second logical pool of two or more event handling components to handle a second event type.

13. The computer system of claim 12, wherein the event generating component is adapted to select one event handling component of the first logical pool to notify of an event based on a least-recently-used selection technique.

14. The computer system of claim 12, wherein the event generating component is adapted to select one event handling component of the first logical pool based on a load balancing technique.

15. The computer system of claim 12, where the computer readable medium further comprises code for:
the second logical pool of two or more event handling components that each applies at least one business process rule to determine at least one aspect of how the computer system should respond to events of the second event type, wherein for each event of the second event type only one event handling component of the second logical pool is notified of the event by the event generating component, and wherein the first event type is different from the second event type.

16. The computer system of claim 15, wherein no event handling component that is a member of the first logical pool is a member of the second logical pool.

17. The computer system of claim 12, wherein each of the event handling components comprises an event enabler and at least one event consumer, wherein the event enabler is a framework configured to receive events from the event generating component and to provide at least some of the received events to the at least one event consumer.

* * * * *